(12) United States Patent
Bichot et al.

(10) Patent No.: US 10,868,795 B2
(45) Date of Patent: Dec. 15, 2020

(54) METHOD FOR MANAGING SERVICE CHAINING AT A NETWORK EQUIPMENT, CORRESPONDING NETWORK EQUIPMENT

(71) Applicant: INTERDIGITAL CE PATENT HOLDINGS, SAS, Paris (FR)

(72) Inventors: Guillaume Bichot, La Chapelle Chaussee (FR); Yvon Legallais, Rennes (FR); Stephane Onno, Saint Gregoire (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 15/849,567

(22) Filed: Dec. 20, 2017

(65) Prior Publication Data
US 2018/0176177 A1  Jun. 21, 2018

(30) Foreign Application Priority Data
Dec. 20, 2016 (EP) .................................. 16306734

(51) Int. Cl.
*H04L 29/12* (2006.01)
*H04L 29/08* (2006.01)
*H04L 12/741* (2013.01)
*H04L 12/46* (2006.01)
(Continued)

(52) U.S. Cl.
CPC ...... *H04L 61/1541* (2013.01); *H04L 12/2856* (2013.01); *H04L 12/4633* (2013.01); *H04L 41/5054* (2013.01); *H04L 45/745* (2013.01); *H04L 61/2596* (2013.01); *H04L 61/35* (2013.01); *H04L 61/6004* (2013.01); *H04L 61/6022* (2013.01); *H04L 67/146* (2013.01); *H04L 67/16* (2013.01); *H04L 67/10* (2013.01)

(58) Field of Classification Search
None
See application file for complete search history.

(56) References Cited

U.S. PATENT DOCUMENTS

| 8,640,220 B1 | 1/2014 | Vincent et al. |
| 2015/0358850 A1* | 12/2015 | La Roche, Jr. ... H04W 28/0215 370/328 |
| 2016/0360703 A1 | 2/2016 | Josyula |

(Continued)

FOREIGN PATENT DOCUMENTS

WO  WO2014161408  10/2014

OTHER PUBLICATIONS

Fu et al, "The topology of service function chaining", Internet Engineering Task Force, IETF, Standard Working Draft, Internet Society (ISOC), Geneva, Switzerland, Jul. 5, 2015, pp. 1-10.

(Continued)

*Primary Examiner* — Ruihua Zhang
(74) *Attorney, Agent, or Firm* — Volpe Koenig

(57) ABSTRACT

A network equipment includes at least one access point interface and is configured to operate a plurality of network functions. The network equipment is configured to be in communication with at least one terminal belonging to a network. The network equipment further includes at least one classifier configured to modify a data frame, the data frame coming from the at least one terminal and being received by the access point interface. The data frame may be modified by replacing an address of the data frame with processing information.

15 Claims, 3 Drawing Sheets

(51) Int. Cl.
    *H04L 12/28*     (2006.01)
    *H04L 12/24*     (2006.01)

(56) References Cited

U.S. PATENT DOCUMENTS

| | | | |
|---|---|---|---|
| 2016/0142226 A1 | 5/2016 | Huang et al. | |
| 2017/0208011 A1* | 7/2017 | Bosch | H04L 47/25 |
| 2018/0070262 A1* | 3/2018 | Nakano | H04W 28/24 |
| 2018/0139098 A1* | 5/2018 | Sunavala | H04L 41/0816 |
| 2018/0309718 A1* | 10/2018 | Zuo | H04L 12/4633 |

OTHER PUBLICATIONS

Bottorff et al., "Ethernet MAC Chaining", Network Working Group, Standard Working Draft (ISOC), Geneva, Switzerland, Jul. 21, 2016, pp. 1-23.

Homma et al., "Analysis on Forwarding Methods for Service Chaining", Service Function Chaining, Standard Working Draft, Internet Society (ISOC), Geneva, Switzerland, Jan. 29, 2016, pp. 1-39.

Quinn et al., "Network Service Header", Service Function Chaining, Standard Working Draft, Internet Society (ISOC), Geneva, Switzerland, Sep. 20, 2016, pp. 1-37.

Abgrall, "Virtual Home Gateway; How can Home Gateway virtualization be achieved?" Eurescom Study Report (Sep. 2011).

Halpern et al., "Service Function Chaining (SFC) Architecture," Network Working Group, Internet Draft, draft-ietf-sfc-architecture-11 (Jul. 24, 2015).

\* cited by examiner

METHOD FOR MANAGING SERVICE CHAINING AT A NETWORK EQUIPMENT, CORRESPONDING NETWORK EQUIPMENT

REFERENCE TO RELATED EUROPEAN APPLICATION

This application claims priority from European Patent Application No. 16306734.1, entitled "METHOD FOR MANAGING SERVICE CHAINING AT A NETWORK EQUIPMENT, CORRESPONDING NETWORK EQUIPMENT", filed on Dec. 20, 2016, the contents of which are hereby incorporated by reference in its entirety.

TECHNICAL FIELD

The present disclosure generally relates to the network virtualization and more particularly to network virtualization services and functions associated with cloud commodity computing hardware.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A residential or corporate gateway is a network equipment interfacing a LAN (Local Area Network) to the Internet. Such an equipment may usually provide—in addition to being a cable, DSL (Digital Subscriber Line) or fiber modem—different features like router, DNS (Domain Name System) proxy, local DHCP (Dynamic Host Configuration Protocol) server, wireless access point, firewall, DynDNS, bridge, etc.

The development of the cloud technologies (such as the virtualization of network functions) allows the emergence of a new architecture for Internet access wherein services running in the residential gateway are moved in the NSP's (Network Service Provider) datacenter. By reducing the complexity of the residential gateway, NSPs hope to reduce the time to market to deploy new services and to ease troubleshooting operations.

Networking Function Virtualization (NFV) enables the provision of network functions for home or corporate gateways directly from the NSP's facility in a cloud provisioning manner. Virtual Customer Premise Equipment (vCPE) is part of the so called Network Function Virtualization paradigm that is about executing network functions (e.g. Router, Deep Packet Inspection, DNS server, Firewall) onto commoditized hardware hosting a virtual machine infrastructure (e.g. private or public cloud infrastructure) instead of requiring specific dedicated hardware. To that end, the home gateway acts as a bridge (BRG) and needs to connect to a virtual gateway (vG) in the cloud to reach the hosts where the network functions are provisioned and run, even for basic functions such as DHCP, Firewall, DNS and UI (User Interface).

A vCPE infrastructure is based on an NFV infrastructure wherein network functions are instantiated operating a cloud infrastructure and interconnected through service paths. Within the vCPE infrastructure, several service paths may co-exist depending on the subscriber/customer plan. Therefore, packets (e.g. IP packets) corresponding to subscriber's flows (such as TCP/UDP flows)—once reached the vCPE infrastructure—may be processed by a chain of network functions depending on the attached service description.

There is a need of a mechanism to establish such network function chaining (so-called service chaining) wherein packets, irrespective of their destination, must be forwarded along their service path (crossing a set of network functions implementing a given processing).

SUMMARY

The disclosure concerns a method to be implemented at a network equipment comprising at least one access point interface and configured to operate a plurality of network functions, said network equipment being configured to be in communication with at least one terminal belonging to a network, wherein said method comprises:
  receiving, by the access point interface, a data frame coming from said one terminal;
  modifying said data frame by replacing an address of the data frame with processing information.

Thus, the aforementioned method can allow for establishing network function chaining to forward data packets, received at a network equipment, along their associated service path, crossing a set of network functions, without creating additional header for embedding service chaining information.

In an embodiment, said method can comprise forwarding, based on said processing information, the modified data frame to a network function for processing.

In an embodiment, said processing information can comprise at least the following parameters:
  service path identifier,
  service index,
  customer identifier.

In an embodiment, said processing information can further comprise at least one of the following parameters:
  direction information,
  a context field.

In an embodiment, said method can comprise updating the service index of the modified data frame after its processing by a network function.

In an embodiment, the replaced address can correspond to either a destination address of the data frame or a source address of the data frame.

In an embodiment, said method can further comprise, before addressing a network function and when the replaced address is a destination address of the data frame:
  replacing said processing information of the data frame with a destination address of said network function to be addressed; and
  replacing a source address of the data frame with said processing information.

In this embodiment, the network function can be running a mode 1 of operation.

In an embodiment, said method can comprise storing, by a last network function of a chain of network functions, at least session information in a lookup table with source address of said one terminal that has generated the data frame.

In an embodiment, the destination address or source address can be located in a header of the data frame.

In an embodiment, the destination address or source address can be a MAC address of an Ethernet frame.

In the example of Ethernet data frame, the 48 bits of a destination MAC address (or source MAC address) can be used to carry the service chaining information according to the following allocation:
- 8 bits for the service path identifier SPI (representing 256 different service paths);
- 7 bits for the service index SI (corresponding to 128 functions to go through);
- 24 bits for the tenant identifier CID (so that more than 16 million of subscribers can be managed by multi-tenant virtual network function);
- 1 bit for the direction indication.

In an embodiment, the apparatus and the network equipment can be interconnected by mean of a tunnelling protocol.

The present principles also concern a network equipment comprising at least one access point interface and configured to operate a plurality of network functions, said network equipment being configured to be in communication with at least one terminal belonging to a network, wherein the network equipment comprises at least one memory and at least one processing circuitry configured to modify a data frame, coming from said one terminal and received by the access point interface, by replacing an address of the data frame with processing information.

In addition, the present principles further concern a network equipment comprising at least one access point interface and configured to operate a plurality of network functions, said network equipment being configured to be in communication with at least one terminal belonging to a network, wherein the network equipment comprises at least one classifier configured to modify a data frame, coming from said one terminal and received by the access point interface, by replacing an address of the data frame with processing information.

In an embodiment, said processing information can comprise at least the following parameters:
- service path identifier,
- service index,
- customer identifier.

In an embodiment, a network function can be configured to update the service index of the modified data frame after processing.

In an embodiment, the replaced address can correspond to either a destination address of the data frame or a source address of the data frame.

In an embodiment, said network equipment can further comprise at least one forwarder configured to forward the modified data frame to a network function for processing, based on its processing information.

In an embodiment, the forwarder can be further configured to, before addressing a network function and when the replaced address is a destination address of the data frame:
- replace said processing information of the data frame with a destination address of the network function to be addressed; and
- replace a source address of the data frame with said processing information.

In this embodiment, the network function can be running a mode 1 of operation.

In an embodiment, a last network function of a chain of network functions can be configured to store at least session information in a lookup table with source address of said one terminal that has generated the data frame.

In an embodiment, the destination address can be a MAC address of an Ethernet frame.

In an embodiment, said network equipment can be adapted to be interconnected to the apparatus by mean of a tunnelling protocol.

Besides, the present disclosure is further directed to a non-transitory program storage device, readable by a computer, tangibly embodying a program of instructions executable by the computer to perform a method at a network equipment comprising at least one access point interface and configured to operate a plurality of network functions, said network equipment being configured to be in communication with at least one terminal belonging to the network, wherein said method comprises:
- receiving, by the access point interface, a data frame coming from said one terminal;
- modifying said data frame by replacing an address of the data frame with processing information.

The present disclosure also concerns a computer program product stored on a non-transitory computer readable medium and comprising program code instructions executable by a processor for implementing a method at a network equipment comprising at least one access point interface and configured to operate a plurality of network functions, said network equipment being configured to be in communication with at least one apparatus connected to a network, said at least one apparatus being in communication with at least one terminal belonging to the network, wherein said method comprises:
- receiving, by the access point interface, a data frame coming from said one terminal;
- modifying said data frame by replacing an address of the data frame with processing information.

The method according to the disclosure may be implemented in software on a programmable apparatus. It may be implemented solely in hardware or in software, or in a combination thereof.

Some processes implemented by elements of the present disclosure may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like.

The disclosure thus provides a computer-readable program comprising computer-executable instructions to enable a computer to perform the method aforementioned.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

BRIEF DESCRIPTION OF THE DRAWINGS

The disclosure will be better understood and illustrated by means of the following embodiment and execution examples, in no way limitative, with reference to the appended figures on which.

Wherever possible, the same reference numerals will be used throughout the figures to refer to the same or like parts.

DETAILED DESCRIPTION

Figure 1:
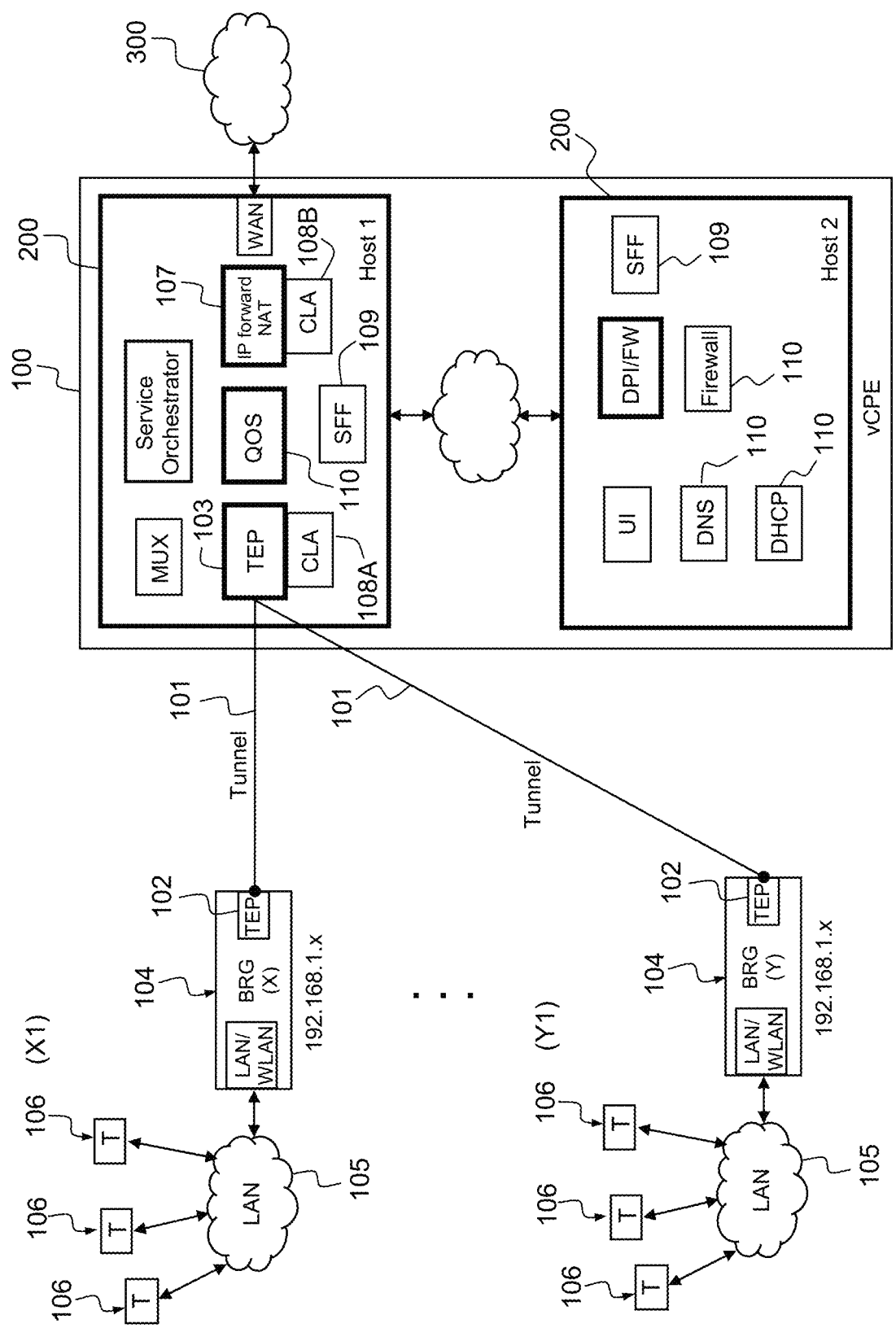
FIG. 1 is a schematic diagram of an example of a network infrastructure adapted to implement some embodiments of the present principles.

The following description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that may be substantially represented in computer readable media and so executed by a computer or processor, whether or not such computer or processor is explicitly shown.

The functions of the various elements shown in the figures may be provided with dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In addition, it is to be understood that the figures and descriptions of the present disclosure have been simplified to illustrate elements that are relevant for a clear understanding of the present disclosure, while eliminating, for purposes of clarity, many other elements found in typical digital multimedia content delivery methods, devices and systems. However, because such elements are well known in the art, a detailed discussion of such elements is not provided herein. The disclosure herein is directed to all such variations and modifications known to those skilled in the art.

FIG. 1 is a schematic diagram of an exemplary network infrastructure comprising a network equipment 100, such as a virtual gateway (vG) or a virtual customer premise equipment (vCPE) and a local network equipment 104, such as a broadband residential gateway (BRG). It is assumed that the gateway functionality is split in two parts, interconnected by mean of a tunnel 101, each part hosting a tunnel endpoint (TEP) 102, 103. This tunnel can be used to abstract from the underlying physical network topology while interconnecting the broadband residential gateway (BRG) 104 (also called bridge or switch) and the virtual gateway (vG) 100 at the link layer.

The left-hand side (represented by the broadband residential gateway 104 (BRG)) can be considered, in one embodiment, to be at the customer's premises, whereas the right hand side (represented by the virtual gateway 100) can be located in a datacenter hosted, for instance, by a network operator. This datacenter can be distributed across multiple locations. On the virtual gateway side, network functions are running within virtual machines interconnected to the home LAN abstraction, namely a layer 2 virtual network overlay that is an extension of the tunnel 101 and an home LAN 105.

It should be understood that, the virtual gateway can be hosted back into a physical gateway, which is the approach for business vCPE. A business vCPE is hosted in an on premises equipment (such as X86 based) offering a virtualization environment equivalent to what the one assumed to be present in the operator's cloud infrastructure.

In one embodiment, virtualized gateway functions can be shared (or mutualized), whenever possible, by a plurality of home LANs to facilitate scaling and maintenance. The BRG 104 can be connected to a home (or business) network 105 (e.g. private network) such a LAN (Local Area Network) or WLAN (Wireless Local Area Network).

Virtual gateway deployment can be managed by a service orchestrator that coordinates the computing and networking configuration from a broadband residential gateway 104 to the datacenter hosting the virtual gateway 100 to manage virtual gateway migration, network service and functions addition/removal or adjustment of QoS policies.

As shown in FIG. 1, the virtual gateway 100 can execute network functions such as UI (User Interface), DHCP server, DNS server, Firewall, NAT (Network Address Translation), etc.

For sake of clarity and simplicity, some elements of the virtual gateway 100 are not shown in FIG. 1.

In the exemplary embodiment of FIG. 1, the virtual gateway 100 can be connected to one or several broadband residential gateways 104. Each BRG 104 can be attached to a local area network (LAN) 105 comprising one or several terminals 106.

At the input of the datacenter, a multiplexing function MUX of each virtual gateway 100 can be provided to ensure connectivity between a physical broadband residential gateway 104 and the associated virtual gateway functions. The multiplexing function can be configured by the orchestrator with the customer's settings. This function can be implemented, for example, by a programmable switch, which may also provide connectivity to the Wide Area Network (WAN) 300 and cloud hosted services. In one embodiment, it is assumed to be a large capacity switching arrangement, possibly assisted by dedicated hardware. It can handle the termination of the tunnel towards each BRG 104 and can re-encapsulate the traffic towards the peer vG services or tag the traffic with a customer ID before passing it to a shared service. As shown in the embodiment of FIG. 1, the multiplexing function can implement a tunnel end point (TEP) function/interface 103 and can re-encapsulate the traffic in a dedicated VxLAN (Virtual Extensible Local Area Network) for each customer 104.

Configuring the switching according to rules derived from customer specific preferences can allow building a service chain, connecting inputs and outputs of services. At a high level, gateway directed traffic can be switched to the adequate network functions (DHCP, DNS, Firewall, parental control, etc.), whereas WAN directed traffic is switched toward NAT or Firewall services.

Each BRG 104 can be built around its own switching fabric (e.g., switching arrangement or configuration such as a switching matrix), that interconnects the different network ports. Each BRG 104 can implement in particular the logic for enabling Generic Routing Encapsulation (GRE) tunneling between the BRG 104 and the vG 100. The GRE tunneling can be configured through an existing procedure (consecutively to a provisioning operation realized by the operator) like the one specified by Broadband Forum. Once a BRG 104 is connected to the access network, after the physical attachment (e.g. xDSL), the BRG 104 can broadcast a DHCP request to obtain network configuration. This corresponding configuration can include the BRG IP address and the GRE tunnel endpoint IP address that is the IP address of the virtual machine hosting the tunnel end point (TEP) virtual function of the virtual gateway 100. It has to be noted that tunneling can relied on protocols (such as VLAN, L2TP, VxLAN) different from GRE.

Once the network configuration is obtained, each BRG 104 can be configured to provide tunnel access 101 (e.g. a GRE tunnel interface) while the corresponding virtual gateway 100 can be automatically configured in the virtual gateway host infrastructure.

In one embodiment, the Tunnel End Point (TEP) function 103 can be configured to terminate the tunneling for transporting layer 2 Ethernet packets and thus extending the LAN's broadcast domain up to the Data Center hosting the vG 100. The TEP function 103 can forward the Ethernet frames over the virtual layer 2 network overlays (e.g. relying on VxLAN protocol) based on different classification strategies (e.g. one straightforward strategy with a one to one mapping between the VxLAN ID and the GRE tunnel/customer ID assuming one tunnel per customer; or another strategy wherein there are several tunnels/applications per customer allowing one VxLAN per tunnel/application instead of one per customer). The TEP function 103 is indeed managing the vG entry point for layer 2 packets coming from a LAN 104. Symmetrically, the TEP function 103 manages the exit point for packet coming out toward the subscriber's LAN 105.

The virtual gateway service corresponds to a layer 3 (IP) gateway service. Packets coming from the subscriber's LAN 105 are forwarded to the WAN interface crossing typically a series of virtual network functions (VNF) such as firewall, NAT, QOS, DNS, Firewall, etc., according to a service path. Similar to the TEP function 103, the NAT virtual network function 107 manages the entry point for layer 3 (i.e. IP) packets coming from the WAN 300. Symmetrically, the NAT function manages the vG exit point for packets coming out to the WAN 300.

For sake of conciseness, it is assumed that the last function hosted by the vG infrastructure for all outbound service paths is the NAT function 107. Naturally, different other arrangements (such as service paths bypassing the NAT function for accessing operator's IP network) can be further contemplated.

Figure 2:
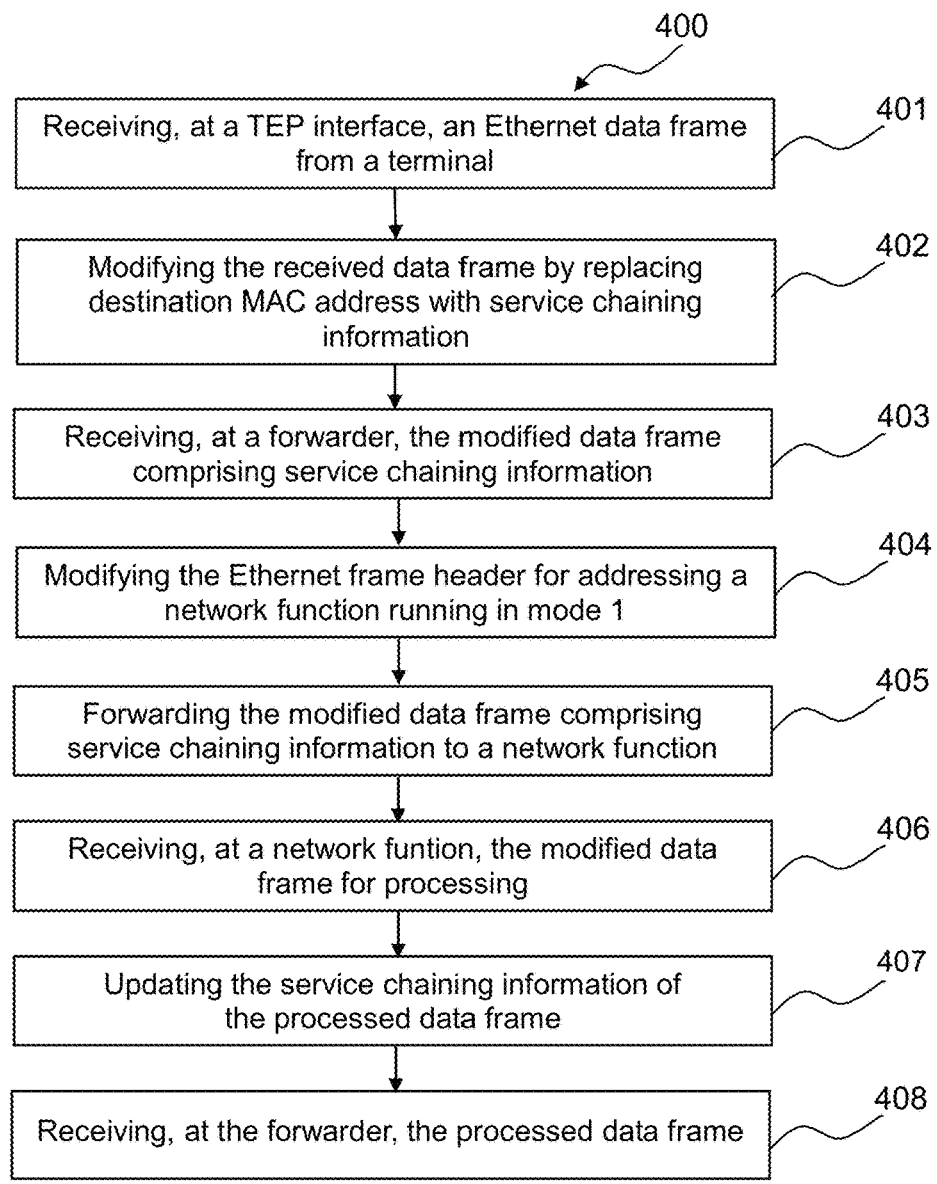
FIG. 2 is a flow chart of an exemplary method for managing service chaining in a network equipment, according to the present principles.

As shown in the embodiment of FIG. 1 and in the exemplary method 400 of FIG. 2, the vG 100 can further comprise an ingress classifier 108A configured to replace (step 402) the destination (or source) address of each data frame—sent by a terminal 106 through a BRG 104 and received (step 401) by the TEP interface 103—with service chaining information (also called processing information). As an illustrative but not limitative example, Ethernet data frames are considered hereinafter and their corresponding MAC address.

It should be understood that the ingress classifier 108A and the TEP 103 can form a single entity or, in a variant, two distinct entities or, in a further variant, the ingress classifier can be embedded within the TEP.

The service chaining information can comprise at least the following parameters:
  a service path identifier (SPI) which identifies a service chain (or path) of network functions among a plurality of service chains. A chain of network functions is an ordered list of network functions,
  a service index (SI) which provides the location within a service chain (namely, a network function of the service chain),
  a customer (or tenant) identifier (CID) which can be used by multitenant functions to identify a BRG 104.

It should be understood that the way service chains are associated per terminal can vary based on subscription pattern. For instance, a service chain can be associated with a subscriber 104 for all the LAN's terminals 106 for both inbound and outbound traffic. Alternatively, a service chain can be different for some terminals 106 attached to the same LAN 105. In addition, a service chain can be different for the inbound traffic and outbound traffic related to a same LAN's terminal 106. VNFs can be further associated with different service chains associated with different customers.

Optionally, the service chaining information can further comprise:
  a direction indication used to differentiate inbound and outbound traffic;
  a context field used for exchanging information between entities along the path.

In the example of Ethernet data frames, the 48 bits of a destination or source MAC (Media Access Control) address can be used to carry the service chaining information according to the following allocation:
  8 bits for the service path identifier SPI (representing 256 different service paths);
  7 bits for the service index SI (corresponding to 128 functions to go through);
  24 bits for the tenant identifier CID (so that more than 16 million of subscribers can be managed by multi-tenant VNF);
  1 bit for the direction indication;
  8 bits for the context field.

Each original Ethernet frame generated by one terminal 106 belonging to a LAN 105 can embed the terminal's Ethernet MAC address as the source MAC address while its destination MAC address can be the default gateway (e.g. either the MAC address of the BRG 104, or the MAC address of the vG 100 corresponding, for instance, to the MAC address of the physical host 1 or the MAC address of the TEP 103, when the BRG 104 behaves like a bridge).

In an embodiment of the present principles, the classifier 108A can be closely coupled with the TEP interface 103 in order to retrieve a tunnel identification used to match the customer identifier CID.

According to the present principles, the vG 100 can further comprise one or several Service Function Forwarder SFF 109 (for example at least one SFF per host 200 operating VNFs). A SFF 109 can be configured to receive (step 403 FIG. 2) an Ethernet frame:

from the classifier 108A once the Ethernet frame has been modified with service chaining information;

from a VNF after processing of the Ethernet frame. A SFF 109 is configured to handle Ethernet frame coming back from a VNF;

from another SFF 109 (e.g. belonging to another host 200).

Each SFF 109 can be further configured to forward (step 405 FIG. 2) an Ethernet frame, received either from the classifier 108A, or from a VNF or from another SFF 109, to a further VNF according to the embedded service chaining information. Finally, a SFF 109 can be further configured to end a service chain of network functions.

Figure 3:
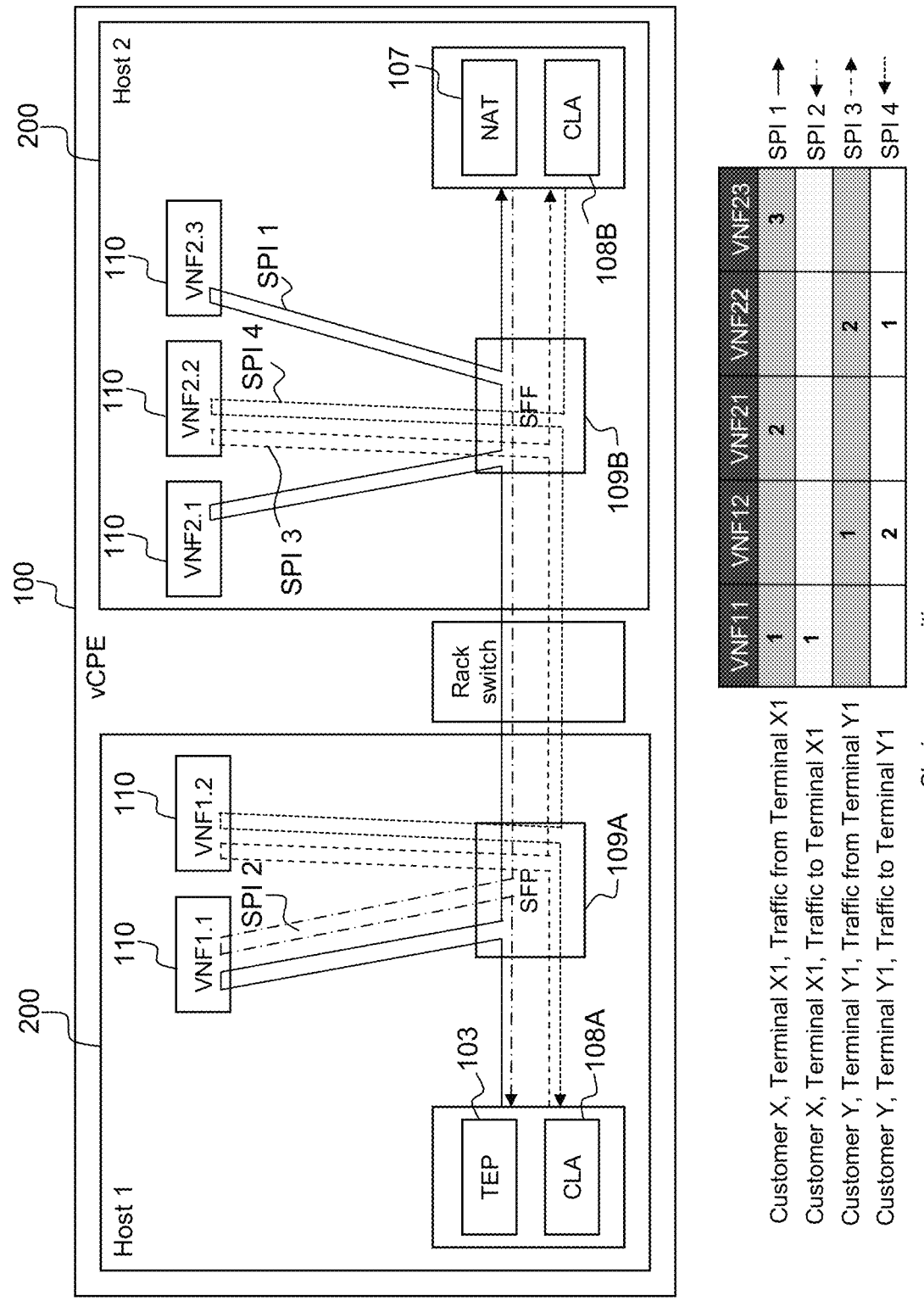
FIG. 3 shows a schematic diagram of one embodiment of a network equipment, according to the present principles.

FIG. 3 provides an illustrative, but not limitative, example where the virtual gateway 100—implementing the present principles—processes Ethernet frames coming from or delivered to a terminal X1 106 of a customer X 104 and Ethernet frames coming from or delivered to a terminal Y1 106 of a customer Y 104 (see FIG. 1). For clarity reasons, some elements of the FIG. 1 are not represented on FIG. 3.

In this example, the service chaining information for an Ethernet frame coming from the terminal X1 is set to:

CID=1, as identifier of Customer X;

SPI=1, which identifies the service path SP1 (or chain of network functions) defined by the three network functions VNF1.1, VNF2.1 and VNF2.3 (in this order);

SI=3, initialized at 3 for the three network functions defining the service path SP1.

The service chaining information for an Ethernet frame coming from the WAN 300 and directed to the terminal X1 is set to:

CID=1, as identifier of Customer X;

SPI=2, which identifies the service path SP2 defined by the network function VNF1.1;

SI=1, initialized at 1 for the single network function defining the service path SP2.

The service chaining information for an Ethernet frame coming from the terminal Y1 is set to:

CID=2, as identifier of Customer Y;

SPI=3, which identifies the service path SP3 defined by the two network functions VNF1.2 and VNF2.2 (in this order);

SI=2, initialized at 2 for the 2 network functions defining the service path SP3.

The service chaining information for an Ethernet frame coming from the WAN 300 and directed to the terminal Y1 is set to:

CID=2, as identifier of Customer Y;

SPI=4, which identifies the service path SP4 defined by the network functions VNF2.2 and VNF1.2 (in this order);

SI=2, initialized at 2 for the two network functions defining the service path SP4.

When receiving an Ethernet frame from terminal X1 or Y1 after being processed by the classifier 108A, a first SFF 109A transfers (step 405 FIG. 2) the Ethernet frame to the correct network function VNF 110 according to service chaining information contains in the destination MAC address. It should be understood that classifier 108A and SFF 109A are configured in a coherent way to ensure that Ethernet frames follow the appropriate service path (SP1 for Ethernet frames coming from terminal X1, SP3 for Ethernet frame coming from terminal Y1).

In the example of FIG. 3, for the service chaining information CID=1, SPI=1, SI=3, the SFF 109A transfers the ingress Ethernet frame (coming from terminal X1) to the VNF1.1. In that case, the Ethernet frame forwarded by the SFF 109A can have the following format:

| Destination MAC Address | Source MAC Address | Ether Type | Payload |
|---|---|---|---|
| CID = 1 SPI = 1 SI = 3 | Device X1 MAC address | 0x0800 | |

According to the present principles, each VNF 110 can support at least one of the two following modes of operation:

a mode 1: listening on its MAC address. In Mode 1, the Ethernet related interface associated with a VNF 110 is configured to only accept Ethernet frames having a destination MAC address corresponding to its interface configuration;

a mode 2 (default mode): listening in promiscuous mode. In Mode 2, the Ethernet related interface associated with a VNF 110 is configured not to filter incoming Ethernet frames and therefore to accept Ethernet frames whatever their destination MAC address is.

When an Ethernet related interface of a VNF 110 does not support mode 2 (only mode 1 is available), the SFF 109A, 109B in communication with that VNF 110 interface supporting mode 1 needs to modify (step 404 FIG. 2) the Ethernet frame header before forwarding the frame to that VNF 110 through the considered Ethernet interface. In particular, the SFF can replace the service chaining information located in the destination MAC address field of the Ethernet frame with the MAC address of that VNF 110 and can move the service information chaining information to the source MAC address of the Ethernet frame, so that the terminal's source MAC address is removed from the Ethernet frame.

In the example of FIG. 3, for the service chaining information CID=1, SPI=1, SI=3, the SFF 109A transfers the ingress Ethernet frame (coming from terminal X1) to the VNF1.1 (assumed to operate mode 1) after having modified the Ethernet frame header. In that case, the Ethernet frame forwarded by the SFF 109A to the first VNF1.1 of SPI1 can have the following format:

| Destination MAC Address | Source MAC Address | Ether Type | Payload |
|---|---|---|---|
| VNF 11 MAC address | CID = 1 SPI = 1 SI = 3 | 0x0800 | |

It is assumed that the VNFs 110 of the vG 100 are aware of the particular configuration (i.e. mode 1 or 2) and are configured to interpret the destination MAC address header (respectively source MAC address header) comprising the service chaining information format as specified above.

With mode 1, a VNF 110 does not have the source MAC address of the original terminal 106 which has generated the Ethernet frame. When necessary, it can for instance use an ARP protocol to retrieve the MAC address of said terminal 106 thanks to the source IP address present in the payload of the Ethernet frame comprising IP packet.

Thus, each VNF 110 can be configured to receive (step 406 FIG. 2) an Ethernet frame which is addressed to it (mode 1) or not (mode 2) depending on the mode of operation and to process the service chaining information. Having the customer identifier CID can allow a VNF 110 to be multi-tenant.

Once the Ethernet frame is processed, a VNF 110 can be further configured to send it back to the SFF 109A after having updated (step 407 FIG. 2) the service chaining information (for instance decrementing the SI value). The SFF 109A can receive (step 408 FIG. 2) the processed Ethernet frame and can adapt its packet header according to mode 2 by updating the source and destination MAC address headers when necessary (e.g. when the processing VNF is in mode 1). When a VNF 110 supports mode 2, the processed Ethernet frame can be directly forwarded by the SFF 109A to a further VNF 110 or SFF 109B.

In the example of FIG. 3, after processing of the Ethernet frame by the VNF1.1, the SFF 109A transfers the Ethernet frame (coming from terminal X1) to the next VNF2.1 of the service path SPI1 after having modified the Ethernet frame header. In that case, the Ethernet frame forwarded by the SFF 109A can have the following format (the SI parameter is decremented by the VNF):

| Destination MAC Address | Source MAC Address | Ether Type | Payload |
|---|---|---|---|
| CID = 1 SPI = 1 SI = 2 | Device X1 MAC address | 0x0800 | |

When the next SFF 109B is hosted in a separate machine (e.g. host 2 in FIGS. 1 and 2), the two SFFs 109A and 109B can be interconnected by mean of a tunneling technology (e.g. VxLAN) extending the layer 2 overlay/virtual network across physical switches and/or routers interconnecting the two physical hosts belonging to the vG infrastructure. When receiving a tunneled packet, the receiving SFF 109A, 1096 can be configured to remove the outer packet header for retrieving the inner Ethernet frame to be forwarded.

It should be noted that when receiving an Ethernet frame from a VNF running either in mode 1 or in mode 2, a SFF 109 can hold all the parameters to identify the next VNF 110 or next SFF 109, service chaining information being integrally embedded into the frame.

When an inbound Ethernet frame (coming from a terminal 106) is received by the last VNF of the service chain (which is the exit point of the vG 100 and is, in the example, assumed to be the NAT function 107), this last VNF can store session information in a lookup table, such as, source and destination IP addresses and the source and destination TCP/UDP port numbers. In addition, the last VNF can allocate a new source UDP/TCP port number and can translate the source IP address with a WAN source IP address. The NAT function 107 can also store the source MAC address (corresponding with MAC address of the terminal 106 that has generated an Ethernet frame).

As part of the inbound traffic, Ethernet frames coming into the vG 100 from the WAN 300 and related to a same session of a previous processed inbound Ethernet frame, an egress classifier 108B coupled with the NAT function 107 (or last network function) can modify the Ethernet MAC header of those frames coming from WAN 300 according to the following process:

it replaces the source MAC address of an Ethernet frame coming from the WAN 300 with the MAC address of the targeted terminal 106 in the customer's LAN 105 (previously stored in the lookup table and retrieved from the latter);

it replaces the destination MAC address with the service chaining information.

In the example of FIG. 3, for the service chaining information CID=1, SPI=2, SI=1, the egress classifier 108B transfers the egress Ethernet frame (coming from the WAN 300 and directed to the terminal X1) to the SFF 109A after having modified the Ethernet frame header. In that case, the Ethernet frame delivered by the classifier 108B to the SFF 109A can have the following format:

| Destination MAC Address | Source MAC Address | Ether Type | Payload |
|---|---|---|---|
| CID = 1 SPI = 2 SI = 1 | Device X1 MAC address | 0x0800 | |

It should be understood that the egress classifier 108B and the NAT function 107 can form a single entity or, in a variant, two distinct entities or, in a further variant, the NAT function can embed the egress classifier. It should further be noted the ingress classifier 108A and the egress classifier 108B can be supported, or not, by the same host 200.

Once the Ethernet frame reaches the exit point of the vG 100 (i.e. the TEP 103 when the frame comes from the WAN 300), the TEP 103 can be configured to:

switch the destination MAC address and the source MAC header fields of the Ethernet frame;

update the source MAC address field (that contains the service chaining information) with the virtual gateway MAC address (such as the MAC address of the physical host 1 or the MAC address of the TEP 103).

When necessary, the service chaining information can be written in the source address field as discussed above. A SFF 109 handles Ethernet frames in the same manner whatever they come from a terminal 106 of a LAN 105 or from the WAN 300.

In another embodiment compliant with the present principles, instead of replacing the destination address of a data frame with service chaining information at the ingress classifier or the egress classifier, the source address of the data frame can be replaced with said service chaining information in a similar mechanism. In other words, in that embodiment, service chaining information is not carried in the header destination address but in the source address. The incoming port or overlay can be used to distinguish packets having service chaining information in the source MAC address from those having it in the destination MAC address.

Naturally, in a further embodiment, the ingress classifier can replace the destination address of a data frame with service chaining information, whereas the egress classifier can replace the source address of a data frame with service chaining information, and conversely.

Thanks to the present disclosure, service chaining information can be embedded in the destination address (or source address) of data frames without creating extra header consuming bandwidth. In addition, no adaptation is then required for supporting the forwarding of data frame based on such extra header.

Figure 4:
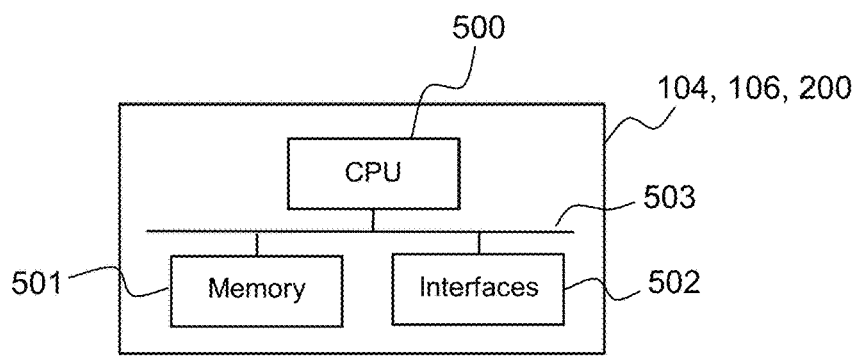
FIG. 4 shows an example of a hardware configuration of each terminal/apparatus/host of network equipment of the FIG. 1, according to the present principles.

As shown in FIG. 4 depicting one example of a hardware configuration, each of the respective terminals 106, network apparatuses 104 and hosts 200 of a vG 100 can comprise a Central Processing Unit (CPU) 500 (comprising one or several processors), a memory 501 and one or several interfaces 502, connected together via a bus 503. The CPU 500 is configured for processing various data and for controlling various function and components of each of the respective terminals 106, network apparatuses 104 and hosts 200. The memory 501 may represent both a transitory memory such as RAM, and a non-transitory memory such as a ROM, a hard drive or a flash memory, for processing and storing different files and information as necessary, including computer program products and software. Some of the above-mentioned functions and/or applications shown in FIG. 1 can be implemented by computer-readable programs stored in the memory 501. The interfaces 502 are used to communicate between the respective terminals 106, network apparatuses 104 and hosts 200 through wired or wireless connection(s). Interfaces 503 can further comprise user input and/or output elements (e.g. a touch panel, a display screen, a keyboard, a remote control, etc.)

In the Figures, it is to be appreciated that the illustrated blocks or modules can correspond to functional modules, which may or may not correspond to distinguishable physical units. For example, a plurality of such modules may be associated in a unique component or circuit, or correspond to software functionalities. Moreover, a module may potentially be composed of separate physical entities or software functionalities.

References disclosed in the description, the claims and the drawings might be provided independently or in any appropriate combination. Features may be, where appropriate, implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A method to be implemented at a network equipment comprising at least one access point interface and configured to operate a plurality of network functions, said network equipment being connected to communicate with at least one terminal belonging to a network via at least one broadband residential gateway, wherein said method comprises:
receiving, by the at least one access point interface, a data frame having a frame header including service chaining information in a destination address field and an address of the data frame in a source address field of the frame header from said at least one terminal; and
modifying, by a service function forwarder of the network equipment, the frame header of said received data frame by replacing the service chaining information in the destination address field with an address of a virtual network function and replacing the address of the data frame in the source address field of the frame header with the service chaining information establishing network function chaining to forward data packets along an associated service path crossing a set of network functions without creating an additional header for embedding service chaining information.

2. The method according to claim 1, further comprising forwarding, based on said service chaining information, the modified data frame to a network function at the address in the destination address field for processing.

3. The method according to claim 1, wherein said service chaining information comprises at least:
a service path identifier,
a service index, and
a customer identifier.

4. The method according to claim 3, further comprising updating the service index of the modified data frame after processing by a network function at the address in the destination address field.

5. The method according to claim 1, wherein the replaced address in the source address field corresponds to either a destination address of the data frame or a source address of the data frame.

6. The method according to claim 5, further comprising, before addressing a network function and when the replaced address in the source address field is a destination address of the data frame:
replacing said service chaining information of the data frame with a destination address of said network function to be addressed; and
replacing a source address of the data frame with said service chaining information.

7. The method according to claim 1, further comprising storing, by a last network function of a chain of network functions, at least session information in a lookup table with a source address of said at least one terminal that has generated the data frame.

8. A network equipment comprising at least one access point interface and configured to operate a plurality of network functions, said network equipment being connected to communicate with at least one terminal belonging to a network via at least one broadband residential gateway,
wherein the network equipment comprises at least one memory and at least one processing circuitry configured to modify a data frame having a frame header including service chaining information in a destination address field and an address of the data frame in a source address field of the frame header from said at least one terminal and received by the at least one access point interface, by replacing the service chaining information in the destination address field with an address of a virtual network function and replacing the address of the data frame in the source address field of the frame header with the service chaining information establishing network function chaining to forward data packets along an associated service path crossing a set of network functions without creating an additional header for embedding service chaining information.

9. The network equipment according to claim 8, wherein the network equipment comprises at least one classifier configured to modify the data frame, coming from said at least one terminal and received by the access point interface, by replacing the address of the data frame in the source address field with the service chaining information.

10. The network equipment according to claim 9, wherein said service chaining information comprises at least:
a service path identifier,
a service index,
a customer identifier.

11. The network equipment according to claim 10, wherein a network function at the address in the destination address field is configured to update the service index of the modified data frame after processing.

12. The network equipment according to claim 9, wherein the replaced address in the source address field corresponds to either a destination address of the data frame or a source address of the data frame.

13. The network equipment according to claim 9, further comprising at least one forwarder configured to forward the modified data frame to a network function at the address in the destination address field for processing, based on its processing information.

14. The network equipment according to claim 13, wherein the forwarder is further configured to, before addressing a network function and when the replaced address is a destination address of the data frame:
replace said service chaining information of the data frame with the destination address of the network function to be addressed; and
replace a source address of the data frame with said service chaining information.

15. The network equipment according to claim 9, wherein a last network function of a chain of network functions is configured to store at least session information in a lookup table with a source address of said at least one terminal that has generated the data frame.

* * * * *